INVENTORS
HUBERT G. HOFFMEISTER
& ARTHUR H. SOANE

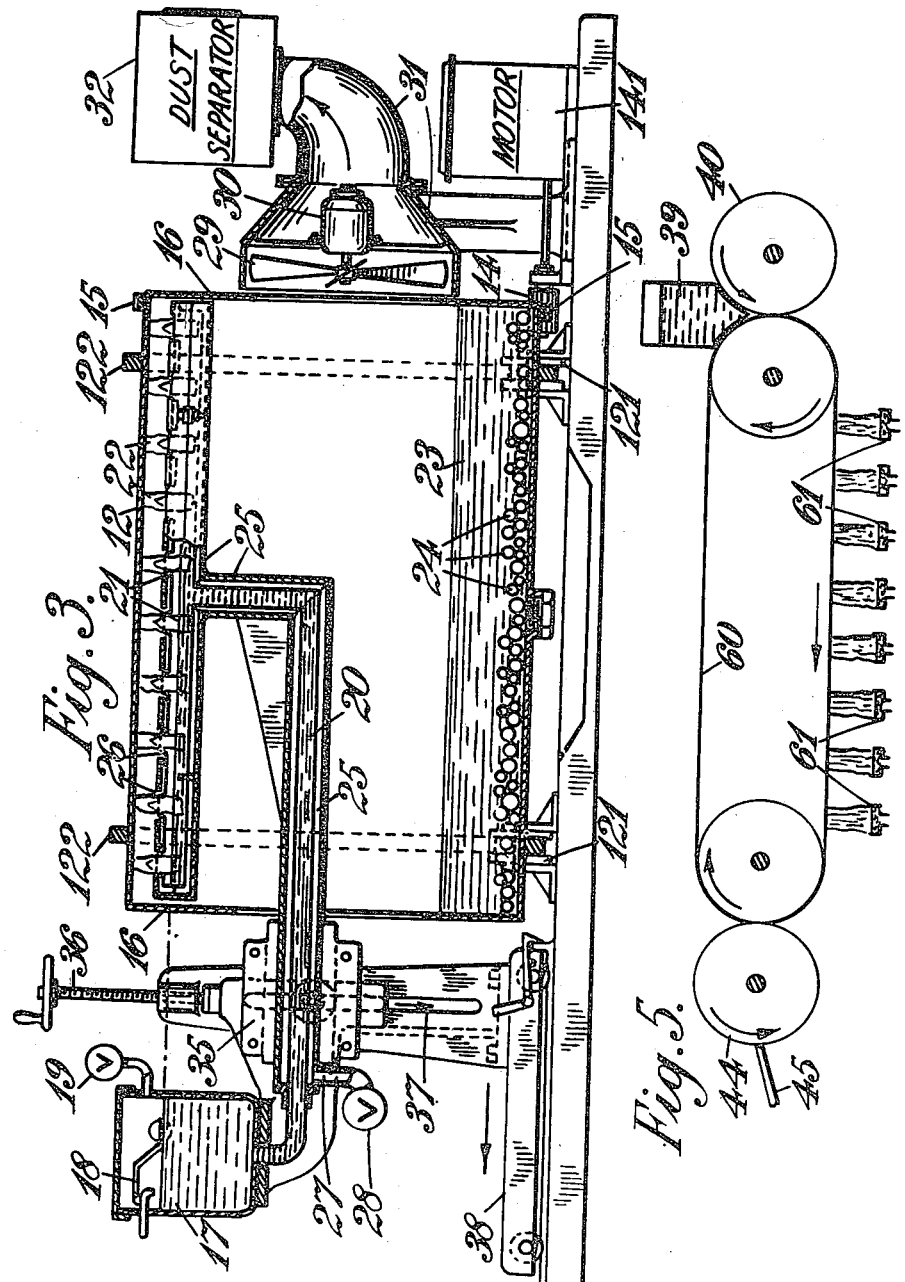

Patented June 10, 1952

2,599,633

UNITED STATES PATENT OFFICE 2,599,633

METHOD AND APPARATUS FOR MAKING PRINTER'S INK

Hubert George Hoffmeister and Arthur Henry Soane, London, England, assignors to Usher-Walker Limited, London, England, a British company Application May 1, 1948, Serial No. 24,658
In Great Britain March 16, 1948

18 Claims. (Cl. 106—28)

This invention relates to improvements in the production of printer's inks and paints containing carbon black dispersed in a liquid vehicle such as oil.

The common method of making printer's ink involves the use of dry carbon black which is manufactured on a large scale generally by the incomplete combustion or thermal decomposition of natural gas; and this dry carbon black is made up into a suspension or dispersion in a suitable liquid vehicle such as mineral or vegetable oil by trituration. To obtain a uniform suspension in which the carbon black has a substantially uniform and very fine particle size, very thorough grinding and/or trituration are required, and much of the machinery used in the manufacture of printing ink and paint is applied to this purpose. Most of the grinding represents a breaking down of aggregates and, in the case of carbon black pigment, the formation of aggregates in the dry state is largely the result of moisture absorbtion.

One object of this invention is to produce from readily available raw materials a smooth printer's ink or paint without employing already prepared dry carbon black and without elaborate grinding or trituration and another object is an apparatus for carrying on the method.

This invention consists of a method of making printer's ink or paint containing carbon black dispersed in a liquid vehicle such as an oil in which method a travelling solid surface is arranged to pick up and carry a film of the vehicle and a smoky flame is directed on to said film.

After the smoky flame has been directed on to the film, said film may be collected into a body of the liquid vehicle with carbon black dispersed therein.

Preferably the body of the liquid vehicle with carbon black dispersed therein is subjected to agitation.

The collected body of the liquid may be used again or repeatedly to form the film on which the smoky flame is directed.

The flame or a series of flames may extend (in the direction normal to the direction of travel of the film) substantially or nearly to the same width or extent as that of the film.

Conveniently in the case of individual flames from wicks or burners the tip of the flame may impinge on the surface of the travelling film.

The rate of supply of air for the flame-producing combustion may be regulated to ensure the production of a smoky flame. The combustible material used to produce the smoky flame may be mineral, vegetable or animal oil, coal or coal products (such as coal gas, creosote, tar oil, tar or pitch) natural gas, wood, peat, old bones, rags or like combustible, smoke-producing material.

The vehicle is a liquid substance or mixture which is capable of forming a film on a moving solid surface and which has a flash-point higher by a safe margin than the working temperature to which said film is exposed. Preferably the vehicle is a mineral oil or a vegetable oil of the type normally used in making printer's ink.

In one arrangement the film is carried on the inner surface of a drum rotating on its axis and the flame is directed upwardly on to the film in the upper portion of the inside of the drum. In that arrangement solid balls (such as steel balls) may be provided in the bottom of the drum (in the collected body of the dispersion) to agitate the mixture of vehicle and carbon black.

If desired the dispersion of carbon black in the liquid vehicle may be withdrawn (continuously or intermittently) from the collected body of the dispersion when the carbon content reaches a prescribed figure; and fresh vehicle may likewise be fed into the drum to replace the product withdrawn. If desired the carbon content of the product may be such as to form a somewhat concentrated dispersion which can be diluted with fresh vehicle before use to suit the requirements of the printer.

The nature of this invention and the manner in which it is carried into effect will be appreciated from the following description of practical examples, reference being made to the accompanying drawings in which Figure 1 is a diagram in central vertical section; and Figure 2 is a diagram in section on the line 2—2 of Figure 1, illustrating one form of apparatus suitable for use in carrying out this invention;

Figure 3 is a longitudinal vertical section of an alternative form of such apparatus;

Figure 5 is a diagram indicating a fourth form of apparatus.

Figure 1:
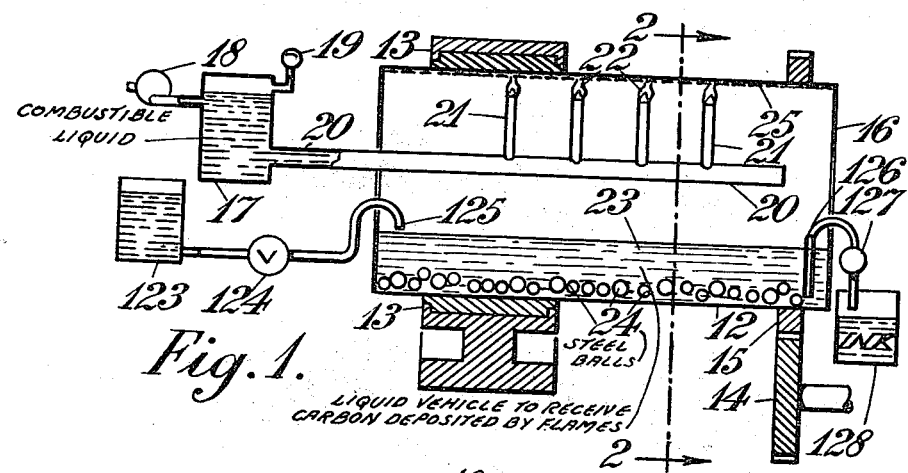
Figure 2:
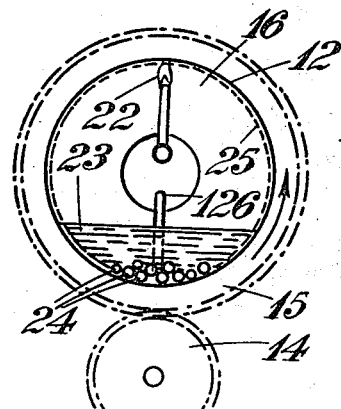

Referring to Figures 1 and 2, a horizontal drum 12 is rotatably supported in journals 13 and can be driven by a spur wheel 14 engaging a driving pinion 15 (or by other known means). The drum 12 has at its ends radial annular flanges 16 which not only serve to contain the liquid but also to assist in determining the supply of air for combustion.

A supply tank 17 for combustible liquid may have a level maintaining device 18 and an air-valve 19, and is connected by conduit 20 to the burners 21 which in this case are wick burners producing flames 22.

The liquid vehicle 23 occupies about 15% of the volume of the drum and at the bottom of the drum are steel balls 24 occupying about 5% of the volume of the drum to agitate the liquid while the drum is revolving.

The dispersion of carbon black in the liquid vehicle, namely the product, may be withdrawn continuously or intermittently from the drum 12 through a pipe 126, a valved pump 127 into an ink receptacle 128; and fresh liquid vehicle may likewise be fed into the drum from a supply tank 123 through a valve 124 controlling the inlet conduit 125.

The drum is rotated at a speed such that a film 25 of the vehicle is maintained on the inside circumference of the drum, the linear speed of movement of the vehicle film passing any point varying between 5 inches and 20 inches per second depending on the heat produced by the burner.

The thickness of the vehicle film 25 depends initially on the viscosity of the vehicle at the operating temperature and subsequently on the percentage of carbon black dispersed in the film. As the film becomes thicker it may become corrugated owing to the agitation caused by the balls in the bottom of the drum.

The vehicle-carrying surface upon which the flame is directed may, if desired, be cooled or heated by well known means.

A suitable vehicle for this method is a hydrocarbon oil known as "Printing Ink Light Oil" having a specific gravity at 60° F. of 0.947, a flash point of 385° F. and a viscosity (Redwood) at 70° F. of 3,700 seconds and at 140° F. of 240 seconds.

A suitable combustible material is a mixture of equal parts by weight of vaporising kerosene (specific gravity at 15.5° C. of 0.791 and refractive index at 20° C. of 1.4425) and fluid creosote (specific gravity at 15.5° C. of 1.046 and refractive index at 20° C. of 1.555).

Referring now to Figure 3, the horizontal drum 12 is rotatably mounted on rollers 121 engaging annular metal bands 122 on the outside of the drum which is driven by a spur wheel 14 engaging a driving pinion 15 on the drum. The spur wheel 14 is driven by motor 141.

The radial annular flanges 16, the supply tank 17 for combustible liquid, the level-maintaining device 18, air-valve 19, liquid-fuel conduit 20, burners 21 and flames 22 are provided as before. So also are the body of liquid vehicle 23 and the steel balls 24.

In this case (Figure 3) the supply of air to the burners 21 is further determined or adjusted by using a jacket 25 around the conduit 20 which jacket has air outlets 26 around the burners 21 and the jacket 25 has an air inlet 27 supplied with air through an adjustable valve 28. A fan 29 driven by motor 30 withdraws the gaseous products of combustion through a hood 31 and through a dust separator and filter 32. The fuel conduit 20, burners 21 and jacket 25 and associated parts may be mounted in a housing 35 vertically adjustably by screw 36 in a slotted frame 37 on a longitudinally movable carriage 38 so that the burners and fuel conduit can be removed from the drum and replaced therein.

Figure 4:
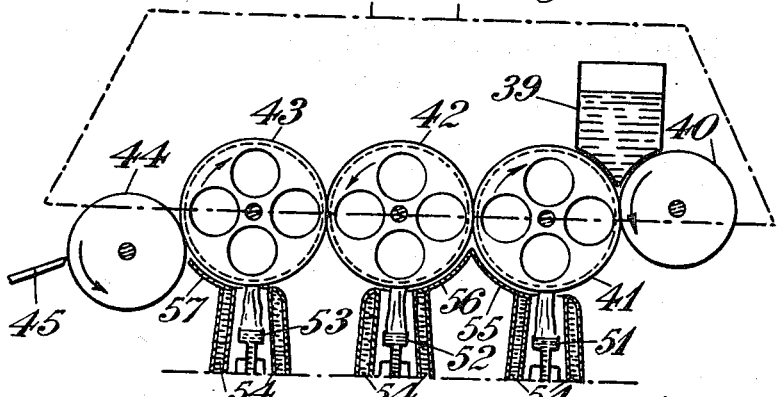
Figure 4 is a diagram indicating a third form of apparatus.

Referring to Figure 4, instead of having the film of liquid vehicle on the inside of a drum, it may be applied externally. Thus a feed roll 40 contacting with a hopper 39 for liquid vehicle may supply a film of the vehicle to a horizontal series of contacting rolls 41, 42, 43, the film of liquid vehicle being transferred to the external surfaces of these three rolls in succession. Finally the film is transferred to delivery roll 44 fitted with a doctor scraper 45.

Under each of the rolls 41, 42, 43 is a row of wick burners 51, 52, 53 each row extending substantially to the length of the roll and each burner supplied with liquid fuel and provided with a restricted air supply to produce smoky flames. Water jackets 54 may extend outside each row of burners and from such water jackets shields 55, 56, 57 may extend around the trailing side of each roll 41, 42, 43 to prevent escape of the smoke. A hood 58 may extend over the apparatus. The rolls 40, 41, 42, 43, 44 may be driven at a uniform peripheral speed.

Referring to Figure 5 the feed roll 40, delivery roll 44 and doctor scraper 45 may be provided as in Figure 4, and in this case a movable continuous flexible metal band 60 may take the place of the rolls 41, 42, 43. The outside surface of the band 60 receives the film of liquid vehicle and the smoky flames from the burners 61 (which extend substantially to the width of the band 60) impinge on the under surface of the band and deposit the carbon black in the film of liquid vehicle.

In this specification the expression "printer's ink" includes the similar material having a liquid vehicle and a suspension of carbon black and used as a paint.

We claim:

1. A method of making printer's ink containing carbon black dispersed in oil, in which method a travelling solid surface picks up and carries a film of the oil and a smoky flame is directed on to said film.

2. A method of making printer's ink containing carbon black dispersed in oil, in which method a travelling solid surface picks up and carries a film of the oil and a smoky flame is directed on to said film, and after the smoky flame has been directed on to the film, said film is collected into a body of the oil with carbon black dispersed therein.

3. A method of making printer's ink containing carbon black dispersed in oil, in which method a travelling solid surface picks up and carries a film of the oil and a smoky flame is directed on to said film, and the same oil in the form of a film again has a smoky flame directed on to it.

4. A method of making printer's ink containing carbon black dispersed in oil, in which method a travelling solid surface picks up and carries a film of the oil and a smoky flame is directed on to said film, and the same oil in the form of a film repeatedly has a smoky flame directed on to it.

5. A method of making printer's ink containing carbon black dispersed in oil, in which method a travelling solid surface picks up and carries a film of the oil and a smoky flame is directed on to said film, and after the smoky flame has been directed on to the film, said film is collected into a body of the oil with carbon black dispersed therein and the body of the oil with carbon black dispersed therein is subjected to agitation.

6. A method of making printer's ink containing carbon black dispersed in oil, in which method a travelling solid surface picks up and carries a film of the oil anl a smoky flame is directed on to said film, and after the smoky flame has been directed on to the film, said film is collected into a body of the oil with carbon black dispersed therein and the collected body of the oil is used repeatedly to form the film on to which the smoky flame is directed.

7. A method of making printer's ink containing carbon black dispersed in oil, in which method a travelling solid surface picks up and carries a film of the oil and a smoky flame is directed on to said film, and a series of smoky flames extends substantially to the same width as that of the film.

8. A method of making printer's ink containing carbon black dispersed in oil, in which method a travelling solid surface picks up and carries a film of the oil and a smoky flame is directed on to said film, the tip of the flame impinging on the surface of the travelling film.

9. A method of making printer's ink containing carbon black dispersed in oil, in which method a travelling solid surface picks up and carries a film of the oil and a smoky flame is directed on to said film, the smoky flame being produced by the combustion of a liquid fuel having a limited supply of air.

10. A method of making printer's ink containing carbon black dispersed in oil, in which method a travelling solid surface picks up and carries a film of the oil and a smoky flame is directed on to said film, and after the smoky flame has been directed on to the film, said film is collected into a body of the oil with carbon black dispersed therein, the film being carried on the inner surface of a rotating drum while the smoky flame is directed upwardly on to said film in the upper portion of the inside of the drum.

11. A method of making printer's ink containing carbon black dispersed in oil, in which method a travelling solid surface picks up and carries a film of the oil and a smoky flame is directed on to said film, which film is carried on the outer surface of a continuous metal sheet which passes above the smoky flame.

12. A method of making printer's ink and the like comprising the steps of passing a surface of an element into and out of contact with a body of liquid which is suitable for use as a vehicle for printer's ink and the like, exposing the surface to a smoky flame and thereby depositing fine carbon particles in the liquid adhering to the surface, and successively exposing the surface to said body of liquid and to a smoky flame, thereby progressively transferring carbon particles from the surface to the body of liquid.

13. A method of making printer's ink and the like comprising the steps of successively passing a surface of an element into and out of contact with a body of oil which is suitable for use as a vehicle for printer's ink and the like while tumbling relatively heavy balls along the surface during its contact with the body of oil, and exposing the surface to a smoky flame to deposit fine particles of carbon in the oil, thereby progressively transferring carbon particles from the surface to the oil.

14. Apparatus for the manufacture of printer's ink and the like, comprising a hollow chamber, means supporting the chamber for rotation about a generally horizontal axis, said chamber having walls adapted to retain a body of liquid in a portion of the chamber as the chamber rotates about said axis and having an interior surface which passes into and out of contact with such body of liquid as the chamber rotates, and burner means within the chamber adapted to produce a smoky flame directed at said surface between immersions of the surface in such body of liquid during rotation of the chamber.

15. Apparatus for the manufacture of printer's ink and the like, comprising a hollow drum, means supporting the drum for rotation about a generally horizontal axis, said drum having walls adapted to retain a body of liquid below said axis as the drum rotates and having an annular interior surface which is constantly partially immersed in and moving through such body of liquid as the drum rotates, and burner means extending into the drum and adapted to produce a smoky flame directed at a portion of said annular surface passing above such body of liquid as the drum rotates.

16. Apparatus for continuous manufacture of printer's ink and the like, comprising a hollow drum, means supporting the drum for rotation about a generally horizontal axis, means to rotate the drum, said drum having walls adapted to retain a body of liquid below said axis as the drum rotates, said drum having at least an axial opening at at least one end thereof, and said drum having an interior surface which passes into and out of contact with such body of liquid as the drum rotates, burner means extending into the drum and adapted to produce a smoky flame directed at said surface between successive immersions of the surface in such body of liquid, means including a liquid container and a connected conduit extending into the interior of the drum to supply and replenish such body of liquid in the drum, and a conduit extending from the lower interior portion of the drum out of the drum to withdraw liquid from said body of liquid.

17. Apparatus for the manufacture of printer's ink and the like, comprising a hollow drum, means supporting the drum for rotation about a generally horizontal axis, said drum having walls adapted to retain a body of liquid below said axis as the drum rotates and having an annular interior surface which is constantly partially immersed in and moving through such body of liquid as the drum rotates, substantially heavy balls disposed within the drum to tumble in such body of liquid along said annular surface as the drum rotates, and burner means extending into the drum and adapted to produce a smoky flame directed at a portion of said annular surface passing above such body of liquid as the drum rotates.

18. Apparatus for the manufacture of printer's ink and the like comprising a member with a circumferential surface thereon, means mounting said member for movement to carry said surface along a generally circular path, burner means mounted to direct a smoky flame at said surface at a place along said path, and means to retain a reservoir of liquid at another place along said path and where the liquid is in contact with said surface, whereby the surface is successively exposed to the flame and the liquid as the member moves to carry the surface along its circular path, thereby progressively transferring carbon particles from the surface to the body of the liquid.

HUBERT GEORGE HOFFMEISTER.
ARTHUR HENRY SOANE.

REFERENCES CITED

The following references are of record in the file of this patent:

UNITED STATES PATENTS

| Number | Name | Date |
|---|---|---|
| 431,881 | Dietrich | July 8, 1890 |
| 440,124 | Armstrong | Nov. 11, 1890 |
| 1,111,009 | Davis | Sept. 22, 1914 |
| 1,550,042 | Ogilvy | Aug. 18, 1925 |
| 1,765,991 | Miller | June 24, 1930 |
| 2,330,922 | Riegler | Oct. 5, 1943 |